March 25, 1969 G. ESTRIN ET AL 3,434,718
PLAYING BOARD WITH REMOVABLE APERTURED OVERLAY DISPOSED
ABOVE A SHIFTABLE WRITING MEDIUM
Filed May 24, 1965
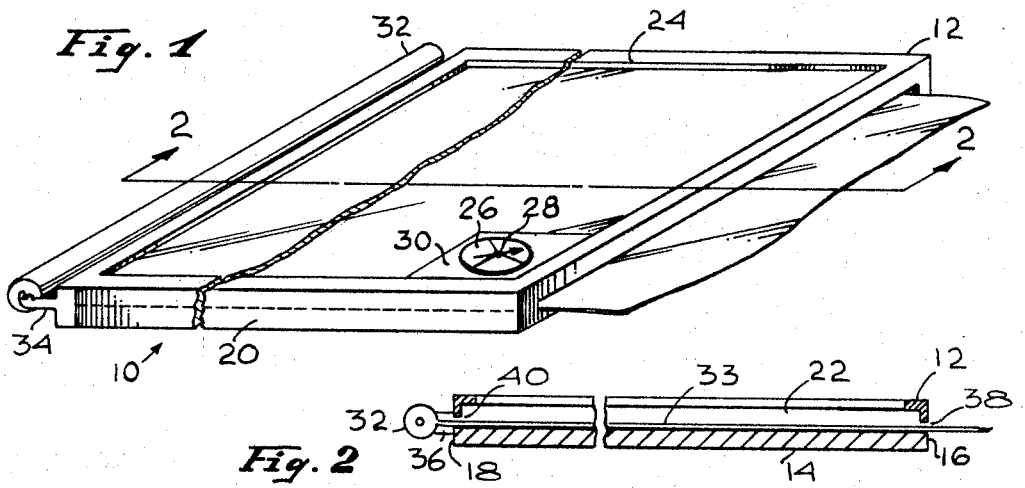
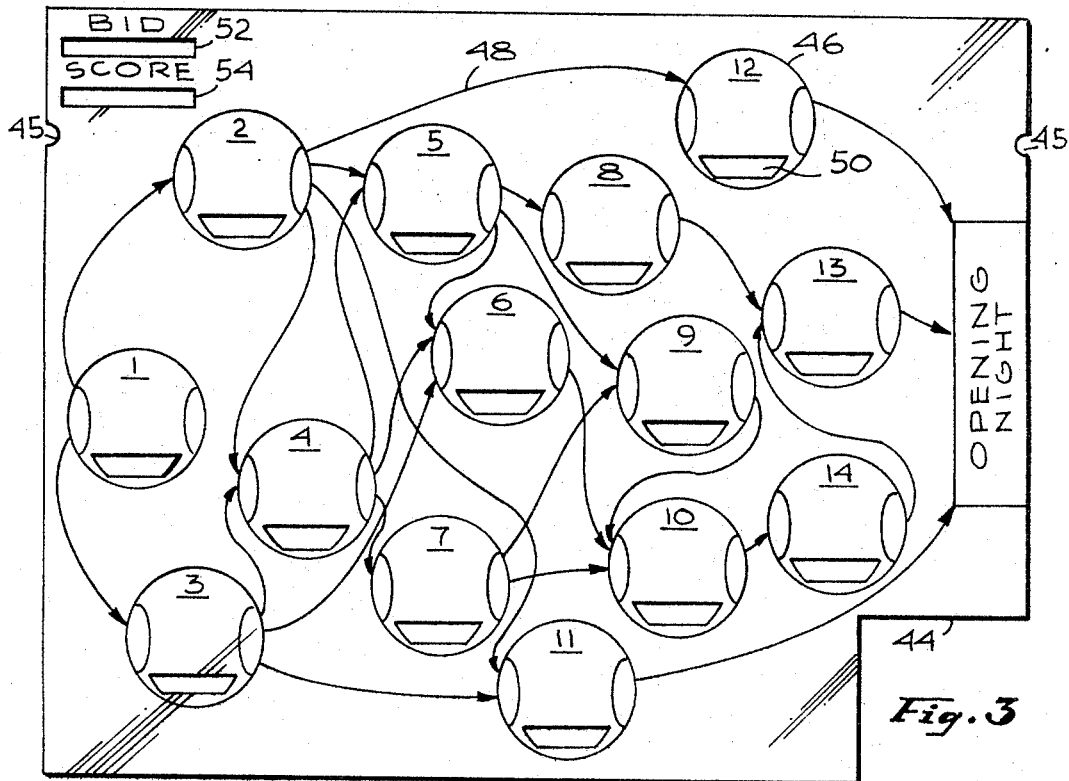
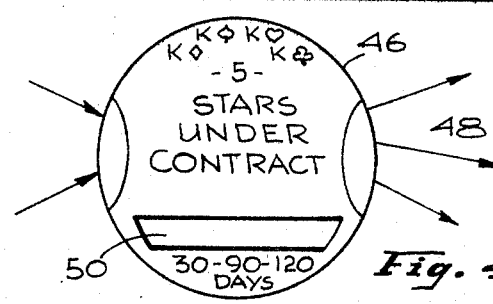
INVENTORS
GERALD ESTRIN
THELMA A. ESTRIN
MARGO ILENE ESTRIN
JUDITH LENORE ESTRIN
BY
ATTORNEYS

United States Patent Office 3,434,718
Patented Mar. 25, 1969

3,434,718
PLAYING BOARD WITH REMOVABLE APERTURED OVERLAY DISPOSED ABOVE A SHIFTABLE WRITING MEDIUM
Gerald Estrin, Thelma A. Estrin, Margo Ilene Estrin, and Judith Lenore Estrin, all of 500 Warner Ave., Los Angeles, Calif. 90024
Filed May 24, 1965, Ser. No. 458,006
Int. Cl. A63f 3/00
U.S. Cl. 273—130      2 Claims

ABSTRACT OF THE DISCLOSURE

A playing board structure useful with a plurality of different overlays, each overlay having indicia thereon defining a different game environment. Each overlay has formed therein openings which provide access to writing paper beneath the overlay, thereby allowing a count to be recorded on the paper and accumulated as the game progresses. The cumulative score of each game participant is thus exposed to all other participants. After a game is completed, the writing paper can be moved beneath the overlay to provide a clean writing surface available through the openings. Associated with each of the openings in the overlay are indicia relating to one of a series of activities which together constitute a complete process, e.g., the production of a theatrical show. The indicia associated with each activity include a list of the resources needed to carry out the activity and indications of various time intervals in which the activity may be completed. Mounted on the playing board is a spinner-type chance device for selecting one of the indicated time intervals.

---

This invention relates generally to board games and more particularly to an improved playing board construction and method of using it.

Various well-known board games provide many hours of relaxing educational entertainment for the multitude of persons who use them. Most often these games employ flat playing boards having indicia printed thereon which indicia of course remains the same each time the game is played. In games of this type which require that a score or some other cumulative count be maintained throughout the course of the game, a separate scratch pad is usually used for this purpose.

In accordance with a first aspect of the present invention, a playing board construction is provided which can accommodate any one of a plurality of different overlays, each overlay having indicia thereon effectively defining a different game environment.

In accordance with a further aspect of the invention, a method of using the playing board by one or more participants is disclosed which method provides entertaining education for training of personnel involved in planning activities (e.g., constructon industry, goverment, etc.). Alternatively the playing board is very useful for merely providing entertainment.

Briefly, it is contemplated that each of the overlays be provided with indicia representing a plurality of activities which together simulate a complex realistic process (e.g., publishing a book, producing a show, building a rocket, constructing a building, making a dress, doing a calculation, etc.). The indicia further explicitly exhibits sequential, parallel, and logical properties of the process. More particularly, the sequence in which activities may occur is exhibited by directed lines (arrowheads) connecting the indicia representing the activities. The logical conditions which constrain the sequence of activities are exhibited at the input to each activity. Within the boundary of each activity, indicia are provided defining the resources required to carry out the activity. Also, different time intervals are indicated defining various lengths of time required to complete the activity. Each opening in the overlay is associated with one of the activities and permits the cumulative time required to complete all activities up to and including a particular activity to be recorded on the writing paper beneath the overlay.

Utilization of the playing board in accordance with the invention provides, in addition to competitive fun for the participants, several educational processes amongst which are:

(1) Learning the activities and planning involved in processes whose results are encountered in everyday life.

(2) Learning the times and resources required to carry out the activities.

(3) Learning that there is probability distribution associated with activities.

(4) Learning that some activities can be done in parallel and that there are precedence conditions determining in what sequence activities must be done.

(5) Learning to recognize the simple logical functions which control sequence.

(6) Learning that there are methods to predict complex events in a manner which can be better than intuitive guesswork.

The novel features that are considerd characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a perspective view of a playing board constructed in accordance with the present invention;

FIGURE 2 is a sectional view taken substantially along the plane 2—2 of FIGURE 1;

FIGURE 3 is a plan view of a typical overlay adapted to be used with the playing board of FIGURE 1; and FIGURE 4 is an enlarged plan view of a portion of the overlay of FIGURE 3.

Attention is now called to FIGURE 1 which illustrates a perspective view of a playing board 10 in accordance with the invention. The playing board essentially comprises a rectangular solid including top and bottom walls 12 and 14 respectively, front and rear walls 16 and 18 respectively, and end walls 20 and 22.

A substantially rectangular opening 24 is defined in the top surface 12 of the playing board 10. A pointer 26 is mounted for rotation about a pivot pin 28 mounted on a portion 30 of the top surface 12 adjacent the opening 24.

A movable writing medium, e.g., a roll of paper 32, is mounted for rotatable movement on a pair of tabs 34 and 36 secured to the end walls 20 and 22. The paper 33 from the roll 32 is adapted to be drawn through aligned slots 38 and 40 respectively formed in the front and rear walls 16 and 18 of the playing board. As illustrated, the paper rides on the upper surface of the bottom wall 14 beneath the opening 24 in the top wall 12. Thus, access to the paper is provided through the opening 24.

Attention is now called to FIGURE 3 which illustrates a typical flat overlay 42 which is adapted to be cooperatively used with the playing board 10 of FIGURES 1 and 2. The overlay 42 defines a periphery which is similar to but slightly smaller than the periphery of opening 24 defined in the top wall. A corner 44 of the overlay is cut away so that the overlay 42 can be received within the opening 24 of the playing board with the cut away corner 44 mating with the portion 30 of the top wall 12 carrying the spinnable pointer 26. The overlay 42 should of course have a greater thickness than that of slots 38 and 40 to assure that it does not fall through the slots. In order to facilitate the removal of the overlay 42 from the opening 24, the overlay is provided with a pair of finger cutouts 45 along its edges.

Typically, the overlay 42 will have indicia thereon arranged to define a plurality of different activity areas 46. The activity areas 46 are connected together by directed lines 48 which, as will be described in greater detail hereinafter, represent restraints on the sequence in which activities can be completed in the course of using a playing board in accordance with the invention. Each of the activity areas 46 includes indicia therein which identify the activity and in addition identify the "resource" required to complete the activity and indicate different time intervals in which the activity can be completed. In addition, an access opening 50 is defined within each activity area 46 which opening communicates with the paper 32 thereby permitting information to be written onto the paper which information will be visible through the access openings 50 in the overlay for so long as the position of the paper is not changed. In addition to the openings 50 associated with each of the activity areas 46, a pair of openings 52 and 54 can be also provided for purposes to be more fully explained hereinafter.

It is contemplated that in the proper utilization of the playing board of FIGURES 1 and 2 and the overlay of FIGURES 3 and 4, a participant will become better acquainted with modern management computational techniques used to plan complex processes and the nature of sequencing within computer systems. The environment of the game is fundamentally established by explicitly exhibiting the sequential, parallel, and logical properties of a simplified realistic process. Such processes can for example comprising the production of a play as illustrated by the overlay of FIGURE 3, which can include a plurality of activities, as detailed in Table I, each of which must be completed before the goal of "opening night" is reached.

TABLE I

| Activity No.: | Activity |
|---|---|
| 1 | Producer-playwright agreement. |
| 2 | Financing complete. |
| 3 | Script complete. |
| 4 | Find director. |
| 5 | Stars under contract. |
| 6 | Complete casting. |
| 7 | Set designer. |
| 8 | Out-of-town bookings. |
| 9 | Costumes, props, scenery. |
| 10 | Start rehearsal. |
| 11 | A publicity campaign. |
| 12 | Theatre booked. |
| 13 | Out-of-town openings. |
| 14 | Dress rehearsal. |

As noted, each activity is represented by an activity area 46 on the overlay of FIGURE 3 with each area including indicia identifying the particular activity. The sequence in which these activities may occur is exhibited by directed lines 48 (arrowheads) between the activities. The logical conditions which constrain the sequence of activities are exhibited at the input to each activity as is shown in FIGURE 4. For example, one set of logical conditions can effectively comprise a logical AND function meaning that all of the input conditions must be satisfied in order to complete a particular activity and only then can an activity subsequent thereto be undertaken. In addition to the indicia identifying the activity, each activity area includes an indication of resources needed to carry out the activity and various lengths of time required to complete the activity. Resources are represented in the form of special resource cards or conventional playing cards whose symbols have a correspondence to symbols in each activity region. Thus, the resources necessary to complete activity 5 represented in FIGURE 4 comprise a king of any suit from a normal deck of cards (resource pool). The three time intervals indicated in each activity area respectively correspond to a short, average, and long time interval. The time interval in which any activity can be completed is determined by spinning the pointer 26. The pointer can come to rest in any one of three areas to select either a short, average, or long time interval. 160° can be allocated to an average interval and 100° each to the short and long intervals.

Briefly, the objectives of the game utilizing the playing board of FIGURES 1 and 2 and the overlay of FIGURES 3 and 4 are for each participant to predict the time it will take to complete the process, i.e., all the activities, to actually complete the process before the lowest predicted time and earlier than the other participants and to minimize the expenditure of resource purchasing power measured in units of play money.

The rules for utilizing the structure of FIGURES 1 through 4 define the allocation of resources amongst the participants and the resource pool, the bidding procedure, the order of play, the allocation of resources by participants to next allowable activities, the chance selection of time, the method for getting resources when the player has a void, the method for calculating and recording cumulative time, and the end of the game. The rules for scoring give weights to the subobjectives thereby affecting the strategy and tactics of the participants.

Any number of players, limited only by the scoring space, i.e., the dimensions of the access openings 50, can cooperatively utilize the apparatus of FIGURES 1 through 4. Each of the participants starts with the execution of the initial activity, that is the agreement between the producer and the playwright. When a participant has the indicated "resources" to complete the first activity, he can progress to a subsequent activity indicated by the arrows 48. That is, after the completion of activity 1, the participant can undertake either to "complete financing" (activity 2) or to "complete the script" (activity 3). Since activities 2 and 3 are not indicated as being sequential in nature, they can be performed by a participant during a single turn if the prescribed resources are available to him. The arrows 48 further dictate to the participant that activity 4 involving finding a director can only be performed after both activities 2 and 3 are completed. On the right end of the playing board, the arrows tell the participant that the goal of opening night is reached only when the main theatre booking, the out-of-town trial openings, and the publicity campaign have all been completed. Although not shown in the exemplary process illustrated in FIGURE 3, it is contemplated that in other processes, some activities may be initiated when any one of a preceding group has been completed (a logical OR function). The logical criteria for each activity is represented by indicia at the inputs to each activity area 46.

The utilization of the apparatus of FIGURES 1 through 4 will now be set forth in greater detail. As noted, any number of participants can cooperatively use the apparatus at any one time. In the use of the apparatus, each participant has essentially three objectives: (1) to reach the goal sooner than the lowest predicted or bid time; (2) to reach the goal in the shortest time in comparison with other participants; and (3) to reach the goal with the least unused resources.

In order to initiate the game, seven resource cards are dealt to each participant and the remainder of the card deck is left as a resource pool. In addition, each participant is given a certain amount of resource purchasing power, e.g., 200 units of play money and a uniquely colored scoring instrument, e.g., a ball point pen. Prior to actually initiating play, the participants successively bid, indicating the time interval in which they feel they can reach the goal. The low bidder wins the bid and this bid is then recorded in the opening 52 defined in the overlay 42. After bidding is completed, all participants expose the resource cards that have been dealt to them.

The low bidder initiates play. If he has resource cards for "allowable" activities he places them on the table. If he has two resource cards for the same "allowable" activity, the time interval required to complete that activity is cut in half. Similarly, three resource cards for the same activity will cut the time in half again. An activity is "allowable" if all of the prior activities required to satisfy the logical criteria defined at its input have been completed. A resource card can comprise the card indicated in the activity area or alternatively can comprise the sum or difference of cards equaling the value of the indicated card (jack=11, queen=12, king=13, ace=1). After placing resource cards on allowable activities, the participant spins the pointer 26 to determine whether a short, average, or long time interval is required for the completion of that activity. The cumulative time is then recorded in the access opening 50 of that activity, which time represents the sum of the interval required to complete the current activity and the intervals required to complete all of the previous activities. The color of the recorded cumulative time identifies the activities completed by the participant. A colored mark is then placed in the access openings of the activities which become "allowable" on the next spin. The resource cards provided by the participant to complete the activity are then returned to the resource pool and play passes to the next participant. If the participant is unable to complete an allowable activity because he does not have adequate resource cards, he can draw from the resource pool (surrendering one unit of resource purchasing power) until he can satisfy the first allowable activity. It is well to require that a participant complete an activity whenever he can satisfy it with a single resource card so that play can proceed. On the other hand, the participant is given an option to determine whether to proceed with play whenever he has resource cards which need to be combined to satisfy a required activity.

Play continues until the first participant reaches the goal. The participant reaching the goal first records the cumulative time required for him to reach the goal, and the sum of the points left in his hand, i.e., his unused resources. His hand is then returned to the bottom of the resource pool. Play continues until all of the participants have reached the goal. Each in turn records his cumulative time and the sum of resources left in his hand and then returns the resource cards to the pool.

A preferred form of scoring involves giving the first participant to actually reach the goal ten bonus points. If the low bidder makes his bid, he is given 100 points. The participant who reaches the goal in the shortest cumulative time receives one point for every ten count difference between his cumulative time and that of each of the other participants. On the other hand, each participant subtracts one point for every ten points of resource cards left in his hand when he reaches the goal. The score of each of the participants is debited by the amount that he has reduced his resource purchasing power. The participant with the maximum resulting score wins.

Although preferred playing and scoring rules have been set forth herein, it is recognized that certain variations can be readily introduced without departing from the essential concept of the use of the apparatus of FIGURES 1 through 4; that is the definition of a plurality of activities and rules of precedence and logic for completing each of those activities within time intervals partially determined by simplified probability considerations. It is further pointed out that many different rules of precedence and logic can be defined without departing from the spirit or intended scope of the invention. Thus any system wherein one or more activity paths are defined between an initial activity and a goal is contemplated. Such paths of course can include serial and parallel portions and as noted differing logical criteria can be defined for the various activities along the path.

Although the dimensions of the apparatus described are not critical, it is contemplated that the overall playing board of FIGURE 1 be approximately 17 inches by 22 inches. In order to facilitate use of the playing board, it is further contemplated that the playing board be comprised of two sections each approximately 11 inches by 17 inches. The circles representing the activity areas on the overlay should preferably have a diameter of about 3 inches. The centers of the circles are preferably staggered so no two access openings are aligned in the direction of paper movement. After play is completed with information being written on the paper and visible through each of openings 50 in the overlay, the paper can be incrementally moved to thereby provide a clean writing surface beneath the openings. In this manner, several rounds of play can be completed utilizing a portion of paper which is about the same size as the playing board itself.

We claim:
1. A playing board construction comprising:
a frame having spaced top and bottom walls;
a movable writing medium disposed between said top and bottom walls;
a flat overlay having a particularly shaped periphery;
said top wall having an opening therein having a periphery similar to that of said overlay and thereby being adapted for receiving said overlay therein;
said overlay having indicia thereon uniquely identifying a plurality of different areas, each of said areas having at least one access opening therein each providing access to said writing medium; and
means for supporting said writing medium for movement relative to said overlay;
said access openings in said overlay being positioned so that no two are in alignment in the direction of movement of said writing medium, said access openings each having two substantially orthogonal dimensions at least large enough to permit the making of a plurality of successive notations therethrough onto said writing medium by a plurality of players.
2. A playing board construction comprising:
a frame having spaced top and bottom walls;
a movable writing medium disposed between said top and bottom walls;
a flat overlay having a particularly shaped periphery;
said top wall having an opening therein having a periphery similar to that of said overlay and thereby being adapted for receiving said overlay therein;
said overlay having indicia thereon uniquely identifying a plurality of different areas, each of said areas having at least one access opening therein each providing access to said writing medium; and each of said areas including indicia identifying a plurality of different quantities; means supporting said writing medium for movement relative to said overlay; and
a selectively actuatable means carried by said playing board for fortuitously selecting one of said different quantities.

References Cited

UNITED STATES PATENTS

| 2,298,456 | 10/1942 | Benko | 273—131 X |
| 2,551,318 | 5/1951 | Drew. | |
| 821,348 | 5/1906 | Fatkin et al. | 273—134 |
| 2,157,589 | 5/1939 | Bullen et al. | 273—136 |
| 2,676,087 | 4/1954 | Wales | 273—130 |
| 2,709,124 | 5/1955 | Wales | 273—136 X |
| 2,801,586 | 8/1957 | Medowar | 273—136 |

FOREIGN PATENTS 801,964  9/1958  Great Britain.

DELBERT B. LOWE, *Primary Examiner.*

U.S. Cl. X.R.

273—136